(12) United States Patent
Shah

(10) Patent No.: US 8,769,021 B2
(45) Date of Patent: Jul. 1, 2014

(54) METHOD AND SYSTEM FOR LIGHT-WEIGHT SOAP TRANSPORT FOR WEB SERVICES BASED MANAGEMENT

(75) Inventor: Hemal Shah, Trabuco Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 2044 days.

(21) Appl. No.: 11/622,857

(22) Filed: Jan. 12, 2007

(65) Prior Publication Data

US 2008/0172482 A1 Jul. 17, 2008

Related U.S. Application Data

(60) Provisional application No. 60/758,586, filed on Jan. 12, 2006.

(51) Int. Cl.
G06F 15/16 (2006.01)

(52) U.S. Cl.
USPC .......... 709/206; 709/203; 709/223; 709/229; 709/230

(58) Field of Classification Search
USPC ....................... 709/203, 206, 223
See application file for complete search history.

(56) References Cited

U.S. PATENT DOCUMENTS

| | | | |
|---|---|---|---|
| 7,269,726 B1* | 9/2007 | Corella | 713/156 |
| 2005/0182843 A1* | 8/2005 | Reistad et al. | 709/230 |
| 2005/0207579 A1* | 9/2005 | Maino et al. | 380/256 |
| 2006/0005070 A1* | 1/2006 | Zimmer et al. | 714/5 |
| 2006/0041669 A1* | 2/2006 | Bemmel et al. | 709/229 |

OTHER PUBLICATIONS

International Preliminary Report on Patentability corresponding to International Application No. PCT/US2007/000832, dated Jul. 24, 2008, 8 pages.
Kwong et al: "Efficient SOAP Binding for Mobile Web Services" Local Computer Networks, 2005. 30th Anniversary. The IEEE Conference on Sydney, Australia Nov. 15-17, 2005, Piscataway, NJ, USA, IEEE, Nov. 15, 2005, pp. 218-225, XP010859193.
Intel: "Intel Management Module—Technical Product Specification" Enterprise Platforms and Services Division, [Online] Jun. 1, 2005, XP002449694.
"Alert Standard Format Specification" DMTF Distributed Management Taskforce, [Online] Apr. 23, 2003, XP002449695.
Steffen Hulegaard: "Embedded Support for WBEM/CIM"; Global Management Conference, [Online] Jun. 16, 2003-Jun. 19, 2003, XP002449696.

\* cited by examiner

*Primary Examiner* — Yves Dalencourt
(74) *Attorney, Agent, or Firm* — Oblon, Spivak, McClelland, Maier & Neustadt, L.L.P.

(57) ABSTRACT

Certain aspects of the present invention provide a method and system for light-weight simple object access protocol (SOAP) transport for web services based management. Aspects of a method may include managing a system using a simple object access protocol (SOAP) message that is mapped over one or both of: a remote management and control protocol (RMCP) and a RMCP security extensions protocol (RSP) to enable remote management of systems using Web services in out-of-band (OOB) management devices.

36 Claims, 7 Drawing Sheets

METHOD AND SYSTEM FOR LIGHT-WEIGHT SOAP TRANSPORT FOR WEB SERVICES BASED MANAGEMENT

CROSS-REFERENCE TO RELATED APPLICATIONS/INCORPORATION BY REFERENCE

This patent application makes reference to, claims priority to and claims benefit from U.S. Provisional Patent Application Ser. No. 60/758,586, filed on Jan. 12, 2006.

The above referenced application is hereby incorporated herein by reference in its entirety.

FIELD OF THE INVENTION

Certain embodiments of the invention relate to network communication. More specifically, certain embodiments of the invention relate to a method and system for light-weight simple object access protocol (SOAP) transport for Web services based management.

BACKGROUND OF THE INVENTION

The web services architecture is based on a suite of specifications that define rich Web-based functions and may be composed to meet varied service requirements. The web services architecture may be utilized in the area of system management in order to promote interoperability between management applications and managed resources. The web services architecture may be enabled to identify a core set of Web service specifications and usage requirements in order to expose a common set of operations that may be central to systems management. For example, the specifications may be enabled to discover the presence of management resources and navigate between them. The individual management resources may be created, renamed, or deleted by adjusting dynamic values. The contents of containers and collections, such as large tables and logs may be enumerated.

The Web service specifications may define minimal implementation requirements for conformant Web service implementations. An implementation of the Web service specifications may be free to extend beyond this set of operations, or choose not to support one or more areas of functionality, if that functionality is not appropriate to the target device or system.

Web services may be self-contained, self-describing, modular applications that may be published, located, and invoked across the Web. Web services definition language (WSDL) may enable service providers to describe the basic format of Web service requests over different protocols or encodings. Web services may be a collection of network endpoints or ports. In WSDL, the abstract definition of endpoints and messages may be separated from their concrete network deployment or data format bindings in order to allow the reuse of abstract definitions of messages, which are abstract descriptions of the data being exchanged, and port types, which are abstract collections of operations. The concrete protocol and data format specifications for a particular port type may constitute a reusable binding. A port may be defined by associating a network address with a reusable binding and a collection of ports may define a service.

The term "system manageability" may represent a wide range of technologies that enable remote system access and control in both OS-present and OS-absent environments. These technologies are primarily focused on minimizing on-site information technology (IT) related maintenance, maximizing system availability and performance to the local user, maximizing remote visibility and access to local systems by IT managers, and minimizing the system power consumption required to keep this connection intact.

Web services based management of computer systems has been growing in popularity. Remote management of systems using web services in out-of-band (OOB) or OS-absent environments is creating significant challenges for the OOB management devices present in the system such as network controllers and baseboard management controllers (BMCs).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for light-weight simple object access protocol (SOAP) transport for web services based management, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for light-weight simple object access protocol (SOAP) transport for web services based management. Aspects of the method and system may comprise managing a system using a simple object access protocol (SOAP) message that is mapped over one or both of: a remote management and control protocol (RMCP) and a RMCP security extensions protocol (RSP) to enable remote management of systems using Web services in out-of-band (OOB) management devices.

Figure 1A:
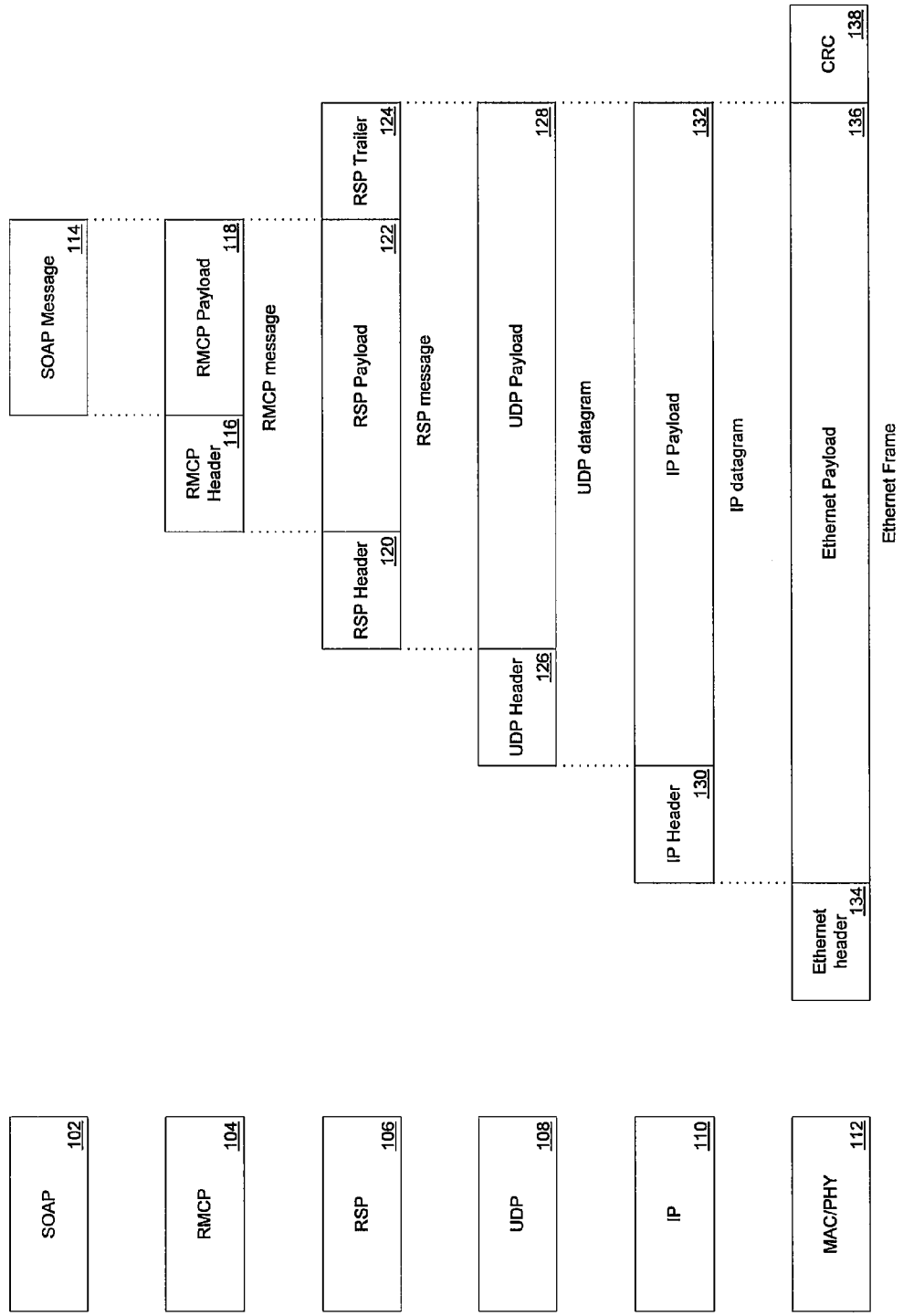
FIG. 1A is a block diagram of an exemplary architecture with SOAP over RMCP/RSP mapping, in accordance with an embodiment of the invention.

FIG. 1A is a block diagram of an exemplary architecture with SOAP over RMCP/RSP mapping, in accordance with an embodiment of the invention. Referring to FIG. 1A, there is shown a simple object access protocol (SOAP) block 102, a remote management and control protocol (RMCP) block 104, a RMCP security extensions protocol (RSP) block 106, a user datagram protocol (UDP) block 108, an Internet protocol (IP) block 110, and a medium access control (MAC) layer and a physical (PHY) layer (MAC/PHY) block 112.

The MAC/PHY layer block 112 may comprise suitable logic, circuitry and/or code that may be enabled to control access to a medium that may be shared between two or more entities. The MAC/PHY layer block 112 may comprise a MAC address that is unique to each network interface controller (NIC). The MAC/PHY layer block 112 may be enabled to encode and decode data packets into bits. The MAC/PHY layer block 112 may be enabled to furnish transmission protocol knowledge and management and may handle errors in the physical layer, flow control and frame synchronization. The MAC/PHY layer block 112 may control how a computer on the network gains access to the data and permission to transmit it. The MAC/PHY layer block 112 may provide for transmission of information over a physical medium connecting two devices by transmitting a bit stream, for example, an electrical impulse, light or radio signal through the network at the electrical and mechanical level. The MAC/PHY layer block 112 provides the hardware for sending and receiving data on a carrier, for example, cables. The MAC/PHY layer 112 may correspond to the lowest layer in a network reference model, for example.

An Ethernet frame may comprise an Ethernet header 134, an Ethernet payload 136, and a cyclic redundancy check (CRC) field 138 associated with the MAC/PHY layer block 112. The Ethernet header field 134 may comprise an Ethernet destination address and an Ethernet source address, and a frame type, for example. The Ethernet payload 136 may comprise a portion of the Ethernet packet that may be utilized to transport user information. The CRC field 138 may comprise data associated with a CRC data validation calculation. The CRC field 138 may be utilized for detecting data transmission errors.

The IP block 110 may correspond to the network layer. The network layer may define how interconnected networks function and may enable receiving data from one computer to another even if it is on a remote network. An IP datagram may comprise an IP header 130 and an IP payload 132 associated with the IP block 110. The IP header 130 may comprise a version and header length field, a service type field, a total length field, an identification field, a flags field, a time-to-live field, a protocol field, a header checksum field, a source IP address field and a destination IP address field.

The UDP block 108 may be layered above the IP block 110. The UDP block 108 may correspond to the transport layer. The transport layer may be enabled to track the data from each application and combine it into a single flow of data to transmit it to the lower layers. The transport layer may also be responsible for defining the means by which potentially large amounts of application data are fragmented for transmission. The UDP block 108 may be utilized to send data between application processes, without some of the reliability and flow management features of TCP, but with greater efficiency. A UDP datagram may comprise a UDP header 126 and a UDP payload 128 associated with the UDP block 108. The UDP header 126 may comprise a source port field, a destination port field, a UDP length field, and a UDP checksum field.

The RSP block 106 may be enabled to provide integrity and anti-replay services for RMCP messages. A RSP message may comprise a RSP header 120, a RSP payload 122 and a RSP trailer 124. When RSP is used, an entire RMCP message may be encapsulated in an RSP header 120 and a RSP trailer 124. The RSP header 120 may be inserted between the UDP header 126 and the RMCP header 116. An RSP trailer 124 may be located at the end of the RMCP message's data block and the security extensions may be applied above the UDP layer.

The RSP header 120 may comprise two fields, for example, a session ID and a sequence Number. A session ID may be an arbitrary number that may be selected by each entity and exchanged using the RSP session protocol (RSSP) open session request/response messages. The session IDs may be utilized to identify a particular session state that may be utilized to process a particular message. The sequence numbers may be utilized along with a sliding receive window to provide an anti-replay service for messages. A sequence number may be a unique monotonically increasing number inserted into the header by the sender. When a session is created, the sequence number may be initialized to zero and incremented by one at the start of the outbound processing for a given message. A new session may be created prior to the sequence number wrapping around back to zero.

A RSP trailer 124 may comprise four fields, for example, a pad field, a pad length field, a next header field and an integrity data field. The pad field may provide a data word alignment for the integrity data field within a protected RMCP message. The pad length field may define the number of pad bytes present in the message. The next header field may indicate the type of message that is encapsulated between the RSP header 120 and the RSP trailer 124. The integrity data field may be utilized to hold the results of an integrity algorithm, for example, a keyed hash function performed over the specific fields of the RSP header 120, RMCP message, and RSP trailer 124.

The RMCP block 104 may be utilized for client control functions when a managed client is in an OS-absent state. In an OS-absent environment, RMCP messages may be exchanged between a management console and a managed client. The client control functions may include operations such as reset, power-up, and power-down. The protocols may enable alert-sending devices' firmware to parse the information in the absence of OS-present drivers.

The RMCP message may be media independent and, depending on the medium, the associated header fields may be different. The RMCP message may comprise a RMCP header 116 and a RMCP payload 118. The RMCP header 116 may comprise a version field, a reserved field, a sequence number field, and a class of message field. The version field may identify the version of the RMCP header. The sequence number field may indicate the sequence number associated with the RMCP message. The sequence numbers may be utilized to ensure reliability over UDP and facilitate message ordering and recognition of identical messages. The sequence number may be incremented each time a unique message is sent from the same source, for example, from a management console or a client system. When the message initiator retries a message due to a missing RMCP acknowledge, the message initiator may send the exact message of the original transmission with the same sequence number allowing the message initiator to match an RMCP message to its associated acknowledgement.

The RMCP payload 118 may comprise an Internet assigned number authority (IANA) enterprise number field, a message type field, a message tag field, a reserve field, a data length field, and a data field. The IANA enterprise number field may indicate the IANA enterprise number associated with the entity that defines the message type values and data field format for the message. The message type field may be defined by the entity associated with the value in the previous field. The message tag field may be utilized to match request-response pairs. The data length field may indicate the number of bytes presenting the data field. The data field may indicate the data associated with a particular enterprise number and message type.

A presence ping sent from a management console may request that the client respond with a presence pong. A capabilities request from a management console may request that the client respond with a capabilities response. A system state request from a management console may request that the client respond with a system state response. The message tag field in the RMCP payload 118 may provide a method to bind a response to its associated request. For example, a management console may send a presence ping with the message tag field set to 12h to a managed client. The client's alert-sending device may copy the message tag field value from the message received into the associated presence pong response prior to transmitting that message. When the management console receives the presence pong, the management console may map the message to its associated presence ping by matching the message tag fields.

Figure 1B:
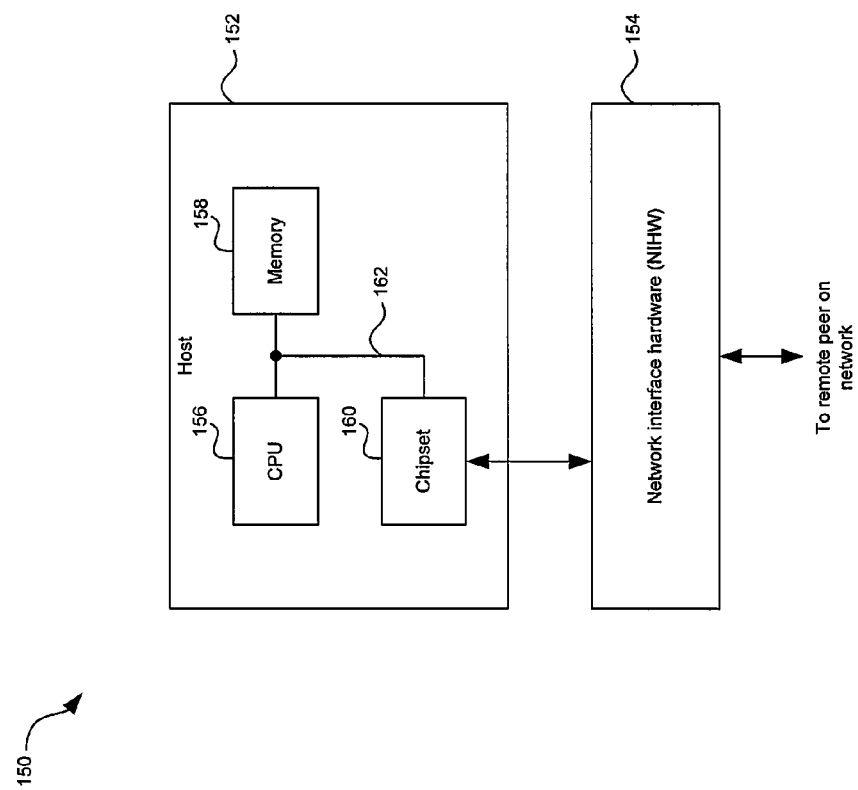
FIG. 1B is a block diagram illustrating a host with network interface hardware, in accordance with an embodiment of the invention.

FIG. 1B is a block diagram illustrating a host with network interface hardware, in accordance with an embodiment of the invention. Referring to FIG. 1B, there is shown a networking system 150, such as a server, a client, or a similar network machine, for example, that may comprise a host 152 and a network interface hardware (NIHW) device 154. The host 152 may comprise a central processing unit (CPU) 156, a memory 158, and a chipset 160. The CPU 156, the memory 158, and the chipset 160 may be communicatively coupled via, for example, a bus 162.

The networking system 150 may enable operation or support of various networking protocols. For example, the networking system 150 may enable supporting of transport control protocol/Internet protocol (TCP/IP) connections. In this regard, the networking system 150 may enable supporting of Internet control message protocol (ICMP), SOAP, RMCP, RSP, UDP, IP, address resolution protocol (ARP), stream control transmission protocol (SCTP), and/or path maximum transmission unit (PMTU) discovery protocol, for example. The ICMP protocol may refer to an ISO/OSI layer 3 protocol that may allow routers, for example, to send error and/or control messages about packet processing on IP networks. The ARP protocol may refer to a low-level protocol within the TCP/IP suite that may map IP addresses to corresponding Ethernet addresses. The SCTP may support the transport of public switched telephone networks (PSTN) signaling messages over connectionless packet networks such as IP networks, for example. The PMTU may refer to a maximum unit of data that may be sent given a physical network medium. In other embodiments, SCTP may be used as the transport protocol rather than TCP.

The host 152 may enable setup parameters for network connections. For example, the host 152 may setup transport layer parameters comprising information that support time stamping, window scaling, delayed acknowledgment policy, flow control scheme to be used, congestion handling, selective acknowledgement (SACK), buffers to be used, and/or other transport related parameters. The host 152 may also setup network layer parameters comprising information that supports IPv4 or IPv6, for example, and options such as no fragments and/or hop limit. The host 152 may also setup data link layer parameters comprising information that supports virtual local area networks (VLAN) and source address to be used, for example.

The CPU 156 may comprise suitable logic, circuitry, and/or code that may enable supporting of the management and/or performance of networking operations associated with remote peers or clients on a network. The CPU 156 may also enable supporting of the management and/or performance of service applications that may be provided to the remote clients on the network.

The memory 158 may comprise suitable logic, circuitry, and/or code that may enable storage of information regarding the networking operations and/or service applications supported by the CPU 156. The chipset 160 may comprise suitable logic, circuitry, and/or code that may enable supporting of memory management, PCI master and arbitrator, graphics interface, I/O master for USB, audio, and/or peripheral devices, for example. In this regard, the chipset 160 may comprise at least one integrated circuit (IC) that provides services in support of the CPU 156 operations. In some instances, the services provided by the chipset 160 may be implemented in separate ICs. The choice of one or more ICs for implementing the chipset 160 may be based on the number and/or type of services provided. The NIHW device 154 may comprise suitable logic, circuitry, and/or code that may enable communication with the host 152. In this regard, the NIHW device 104 may enable communication with the CPU 156, the memory 158, and/or the chipset 160.

Figure 1C:
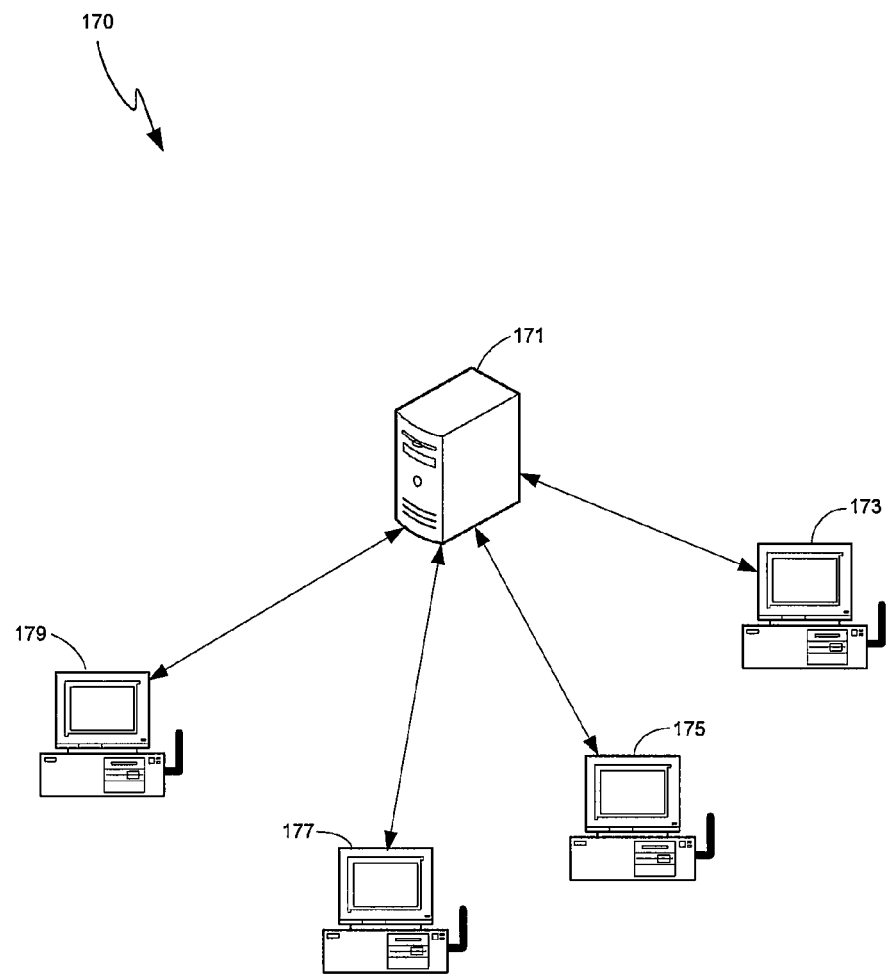
FIG. 1C is a block diagram of an exemplary client server architecture that may be utilized in connection with an embodiment of the invention.

FIG. 1C is a block diagram of an exemplary client server architecture that may be utilized in connection with an embodiment of the invention. Referring to FIG. 1C, there is shown a system 170 that comprises a host 171 and a plurality of clients, client 173, client 175, client 177 and client 179. The host 171 may comprise suitable logic, circuitry and/or code that may be enabled to manage the system 170 using a simple object access protocol (SOAP) message that is mapped over one or both of: a remote management and control protocol (RMCP) and a RMCP security extensions protocol (RSP) to enable remote management of systems using Web services in out-of-band (OOB) management devices or clients, for example, client 173, client 175, client 177 and client 179.

The system 170 may comprise a management console that may utilize RMCP to manage the plurality of clients, client 173, client 175, client 177 and client 179. The management console may utilize OS-present methods as a primary method to power-down or reset a managed client so that any shutdown operation may be handled in an orderly fashion. The management console may employ RMCP if the managed client fails to respond to the OS-present methods.

Figure 2:
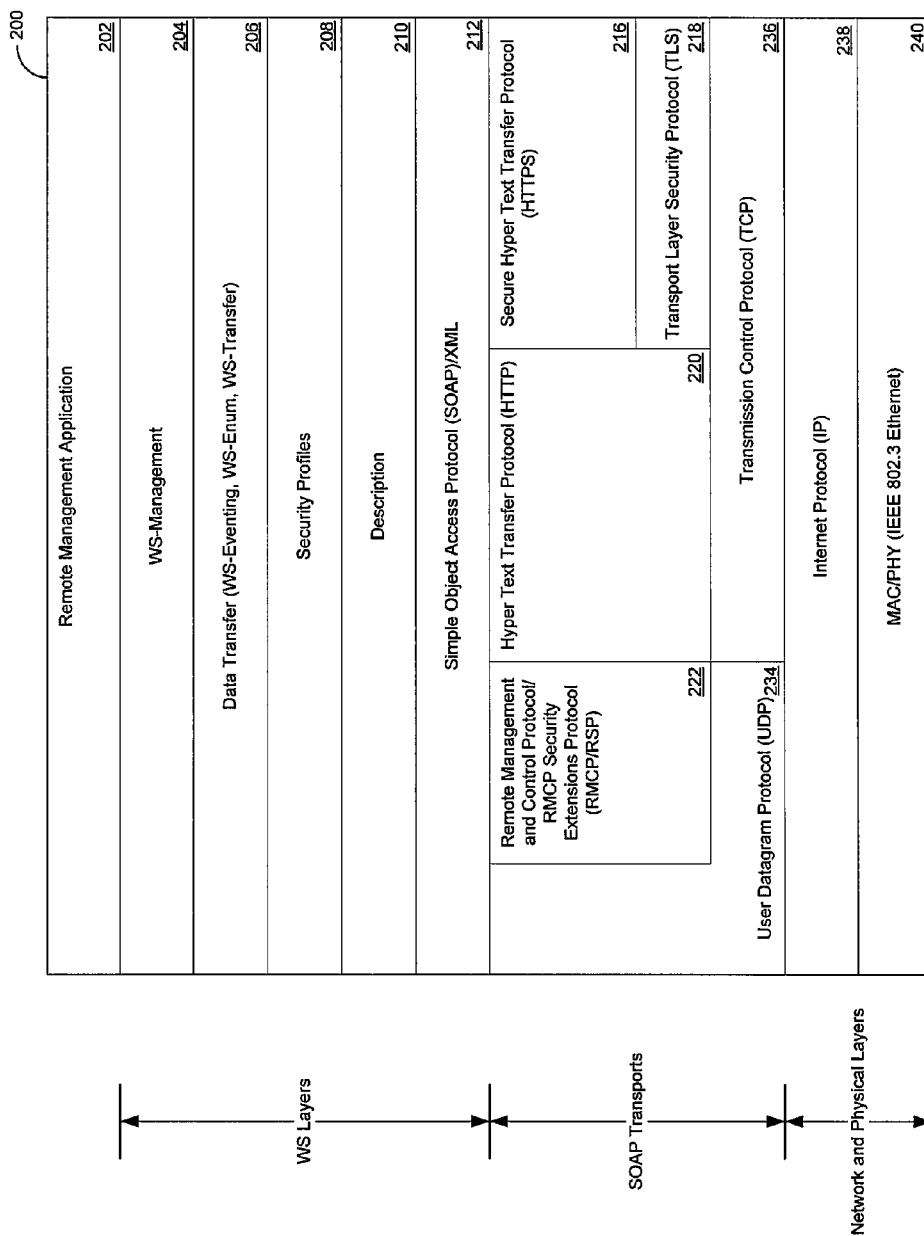
FIG. 2 is a block diagram illustrating a WS-MAN stack with various SOAP transports, in accordance with various embodiment of the invention.

FIG. 2 is a block diagram illustrating a Web services management (WS-MAN) stack with various SOAP transports, in accordance with various embodiment of the invention. Referring to FIG. 2, there is shown a Web services management (WS-MAN) stack 200 with various SOAP transports. The WS-MAN stack 200 may comprise a MAC/PHY layer block 240, an IP block 238, a UDP block 234, a transmission control protocol (TCP) block 236, a RMCP/RSP block 222, a hyper text transfer protocol (HTTP) block 220, a secure hyper text transfer protocol (HTTPS) block 216, a transport layer security protocol (TLS) block 218, a simple object access protocol (SOAP) block 212, a description block 210, a security profiles block 208, a data transfer block 206, a Web services management (WS-management) block 204 and a remote management application block 202.

The MAC/PHY layer block 240 may comprise suitable logic, circuitry and/or code that may be enabled to control access to a medium that may be shared between two or more entities. The MAC/PHY layer block 240 may comprise a MAC address that may be unique to each network interface controller (NIC). The MAC/PHY layer block 240 may be enabled to furnish transmission protocol knowledge and may handle errors in the physical layer, flow control and frame synchronization. The MAC/PHY layer block 240 provides the hardware for sending and receiving data on a carrier, for example, cables. The MAC/PHY layer block 240 may correspond to the physical layer. The IP block 238 may correspond to the network layer. The network layer may define how interconnected networks function and may enable receiving data from one computer to another even in instances where it may be on a remote network.

The UDP block 234 and the TCP block 236 may be layered above the IP block 238. The UDP block 234 and the TCP block 236 may correspond to the transport layer. The transport layer may be enabled to track the data from each application and combine it into a single flow of data to transmit it to the lower layers. The transport layer may also be responsible for defining the means by which potentially large amounts of application data are fragmented for transmission. The UDP block 108 may be utilized to send data between application processes, without some of the reliability and flow management features of the TCP block 236, but with greater efficiency.

The RMCP/RSP block 222 may be enabled to provide integrity and anti-replay services for RMCP messages. When RSP is used, an entire RMCP message may be encapsulated in an RSP header and a RSP trailer. The RMCP/RSP block 222 may be utilized for client control functions when a managed client is in an OS-absent state. In an OS-absent environment, RMCP messages may be exchanged between a management console and a managed client. The client control functions may include operations such as reset, power-up, and power-down. The protocols may enable alert-sending devices' firmware to parse the information in the absence of OS-present drivers.

The HTTP block 220 may be a TCP/IP application that may be enabled to implement the Web, by enabling the transfer of hypertext documents and other files between a client and a server. The HTTPS block 216 may be enabled to use a secure sockets layer (SSL) or a transport layer security (TLS) algorithm to ensure privacy of HTTP connections. The TLS protocol block 218 may be enabled to provide secure communications on the Internet for various applications, for example, web browsing, e-mail, Internet faxing, and other data transfers. The various SOAP transports in the WS-MAN stack 200 may comprise the UDP block 234, the TCP block 236, the RMCP/RSP block 222, the HTTP block 220, and the HTTPS block 216 and the TLS block 218.

The SOAP block 212 may be enabled to exchange markup language messages such as XML-based messages over a computer network, using HTTP, for example. The SOAP block 212 may form the foundation layer of the WS-MAN stack 200 by providing a basic messaging framework over which more abstract layers may be built. The SOAP block 212 may be enabled to implement a remote procedure call (RPC), in which one network node, for example, a client may send a request message to another node, for example, a server, and the server may send a response message to the client. The SOAP block 212 may be a light-weight protocol intended for exchange of structured information in a decentralized, distributed environment.

A SOAP binding specification may declare the features provided by a binding. The SOAP binding specification may describe how the services of the underlying protocol are used to transmit SOAP message infosets and describe how the services of the underlying protocol are used to honor the contract formed by the features supported by that binding. The SOAP binding specification may describe the handling of potential failures that may be anticipated within the binding and may define the requirements for building a conformant implementation of the binding being specified.

In accordance with an embodiment of the invention, the creation, transmission, and processing of a SOAP message, through one or more intermediaries, may be specified in terms of a distributed state machine. The state may comprise information known to a SOAP node at a given point in time, including but not limited to the contents of messages being assembled for transmission or received for processing. The state at each node may be updated either by local processing, or by information received from an adjacent node. The purpose of a binding specification may be to augment core SOAP rules with additional processing that may be particular to the binding, and to specify the manner in which the underlying protocol may be used to transmit information between adjacent nodes in the message path.

The distributed state machine that manages the transmission of a given SOAP message through its message path may be a combination of core SOAP processing operating at each node, in conjunction with the binding specifications connecting each pair of nodes. The minimum responsibility of binding in transmitting a message may include specifying the means by which a SOAP message infoset may be transferred to and reconstituted by the binding at the receiving SOAP node and to specify the manner in which the transmission of the envelope may be affected using the facilities of the underlying protocol.

The description block 210 may allow a programming model, transport, or protocol for communication between peers. The description block 210 may describe the messages accepted and generated by the WS-MAN stack 200 and may describe application-level error messages generated by the WS-MAN stack 200. The security profiles block 208 may include a plurality of security profiles to protect management operations and responses against attacks such as snooping, interception, replay, and modification during transmission. The transport layer may be responsible for message integrity, protection, authentication and/or security. The security profiles may be utilized for descriptive and metadata purposes and may not be visible in the SOAP traffic.

The data transfer block 206 may comprise a plurality of resource access operations, for example, getting, setting and enumerating values. For example, the WS-transfer specification may be utilized as a basis for a unary resource access. The WS-enumeration messages may be utilized for multi-instance retrieval. The WS-eventing messages may be utilized to emit and publish events by allowing clients to subscribe and receive event messages.

The WS-management block 204 may comprise a general SOAP-based protocol for managing systems such as PCs, servers, devices, Web services, and other manageable entities. The WS-management block 204 may be designed to meet a plurality of requirements, for example, to constrain Web services protocols and formats so that Web services may be implemented in management services in both hardware and software. The WS-management block 204 may ensure compatibility with other Web services specifications. The WS-management block 204 may enable IT managers to remotely access devices on their networks, regardless of whether the systems are out of the box, powered down or otherwise unavailable. The remote management application block 202 may enable out of band remote management capabilities with systems such as PC desktop systems and/or servers.

In accordance with an exemplary embodiment of the invention, SOAP over RMCP may comprise a mapping of SOAP messages over RMCP/RSP transport. RMCP/RSP is a message-oriented protocol layered above UDP. RMCP/RSP may be used as a transport in ASF and intelligent platform management interface (IPMI) based out of band (OOB) management solutions in client and server systems. RMCP may provide reliability over UDP in terms of sequencing, message level acknowledgements, and limited retransmissions. RSP may provide sufficient security over UDP in the form of message integrity and data origin authentication. In accordance with an embodiment of the invention, additional encryption services may be provided by adding encryption support using RMCP+ or by encrypting portions of SOAP messages.

Figure 3:
FIG. 3 is a block diagram illustrating a WS-MAN stack that may co-exist with an ASF stack with a migration path from the ASF stack to the WS-MAN stack, in accordance with an embodiment of the invention.

FIG. 3 is a block diagram illustrating a WS-MAN stack that may co-exist with an ASF stack with a migration path from the ASF stack to the WS-MAN stack, in accordance with an embodiment of the invention. Referring to FIG. 3, there is shown a Web services management (WS-MAN) stack 300 with various SOAP transports. The WS-MAN stack 300 may comprise a MAC/PHY layer block 340, an IP block 338, a UDP block 334, a transmission control protocol (TCP) block 336, a platform event trap (PET) block 322, a simple network management protocol (SNMP) block 324, a RSP session protocol (RSSP) block 326, and a RSSP authentication and key generation protocol (RAKP) block 328. The WS-MAN stack 300 may also comprise a RSP block 330, a RMCP block 332, a HTTP block 320, a HTTPS block 316, a TLS block 318, an alert standard format (ASF) block 314, a SOAP block 312, a description block 310, a security profiles block 308, a data transfer block 306, a Web services management (WS-management) block 304 and a remote management application block 302. The various protocols and SOAP transports in FIG. 3 may be substantially as described in FIG. 2.

The RSP block 330 may be enabled to provide integrity and anti-replay services for RMCP messages. When RSP is used, an entire RMCP message may be encapsulated in an RSP header and a RSP trailer. The RMCP block 332 may be utilized for client control functions when a managed client is in an OS-absent state. In an OS-absent environment, RMCP messages may be exchanged between a management console and a managed client. The client control functions may include operations such as reset, power-up, and power-down. The protocols may enable alert-sending devices' firmware to parse the information in the absence of OS-present drivers.

In operation for out-bound message processing, when an RMCP request initiator creates a message, its RMCP protocol engine may access the device security policy to determine whether RMCP security extensions functionality is enabled. If the functionality is enabled, the RMCP block 332 may determine whether an appropriate RSP session exists for the message. If an appropriate session does not exist, the RMCP block 332 may use the RSSP block 326 to create a session. If a session exists, but the session is not in the message transfer phase, the RMCP block 332 may wait until the session reaches that phase before the RMCP message may be sent. If a session exists and the session is in the message transfer phase, the RMCP block 332 may pass the session ID, the RMCP message and the RMCP message length to the next lower-layer protocol for additional processing.

When a sending device's RSP protocol engine receives a message from the RMCP block 332, the RSP block 330 may insert a RSP header at the beginning of the message and may copy the session ID value into the header's session ID field. The RSP block 330 may use the session ID to access the session state, increment the session's sequence number and then insert that value into the sequence number field of the RSP header. The RSP block 330 may be enabled to create a RSP trailer at the end of the message's data block. The RSP block 330 may compute the amount of padding required to align the protected message's integrity data field on a data word boundary. The RSP block 330 may use the RMCP message length passed from the RMCP block 332 to locate the end of the message's data block, and insert the correct number of pad bytes and the values for the RSP trailer's pad length and next header fields.

The RSP block 330 may use the session ID to access the session state and determine a particular integrity algorithm to be utilized with the message, and may compute the integrity data over the encapsulated message. The calculated value may be inserted into the integrity data field of the RSP trailer in order to create a protected RMCP message. The RSP block 330 may be enabled to update the message length to account for the addition of the RSP header and RSP trailer, and pass the UDP source and destination port values, the protected RMCP message length, and the protected RMCP message to the next lower-layer protocol, for example, UDP block 334 for additional processing.

When the UDP block 334 receives a message from the RSP block 330, the sending device's UDP protocol engine may insert its header at the beginning of the protected RMCP message. The UDP block 334 may be enabled to copy the port values passed from RSP block 330 into the UDP header's source port and destination port fields. The UDP block 334 may be enabled to compute the UDP packet length and checksum and insert these values into the UDP length and checksum fields. The resulting UDP packet may be passed to other lower-layer protocols, for example, IP block 338 and MAC/PHY layer block 340 for additional processing and eventual transmission to its destination.

In operation for in-bound message processing, when a frame comprising a protected RMCP message reaches its destination, the lower-layer protocols, for example, the MAC/PHY layer block 340 and IP block 338 in the receiving device may pass the resulting packet to the next higher-layer protocol, for example, UDP block 334 for additional processing. The UDP block 334 in the receiving device may be enabled to validate the checksum field in the UDP header. If the checksum field is invalid, the UDP block 334 may discard the packet. If the checksum field is valid, the UDP block 334 may verify whether it supports the upper-layer protocol specified by the value in the destination port field. If the upper-layer protocol is not supported, the UDP block 334 may discard the packet. If the upper-layer protocol is supported, the UDP block 334 may strip off its header, update the protected RMCP message length and pass the protected RMCP message and its length to the next higher-layer protocol, for example, the RSP block 330 for additional processing.

When the RSP block 330 receives a protected RMCP message from the UDP block 334, the RSP block 330 may access the device security policy to determine whether RMCP security extensions functionality is enabled. If the functionality is disabled, the RSP block 330 may discard the message. If the functionality is enabled, the RSP block 330 may use the RSP header's session ID value to locate the session state for this message. If no session state may be located for this message, the RSP block 330 may discard the message. If a session exists but the session is in a phase that does not allow this protected RMCP message to be accepted, the RSP block 330 may discard the message. If a session exists and the session is in a phase that allows the protected RMCP message to be accepted, the RSP block 330 may use the integrity algorithm specified in the session state and the protected RMCP message length passed from the UDP block 334 to locate and validate the integrity data field in the RSP trailer. If the integrity data field is invalid, the RSP block 330 may discard the message. If the integrity data field is valid, the RSP block 330 may use the RSP header's sequence number field and the sliding receive window information in the session state to determine whether this message is new and not a duplicate of a previously received message and the position of the message with respect to the sliding receive window.

The received message may be new and may be either inside the sliding receive window or to the right of the sliding receive window. If the received message is not new, the RSP block 330 may discard the message. If the received message is to the right of the sliding receive window, the sliding receive window may be advanced to the right to encompass the message. In accordance with an embodiment of the invention, a message may be received out-of-order and be properly processed. If the sequence number processing completes successfully, the RSP block 330 may save the sequence number value in the next header field and use the value in the pad length field to compute the number of pad bytes that may be removed from the end of the message. The RSP block 330 may strip off the RSP header and RSP trailer and update the length value of the RMCP message. The RSP block 330 may pass the RMCP message and its corresponding length to the next higher-layer protocol, for example, the RMCP block 332 for additional processing.

The RSSP block 326 may be enabled to establish an association between a management console and its corresponding clients. The association may keep track of the state information that defines the relationship, for example, the particular algorithms to be used, keying material, and sequence numbers. The association may be established via a session protocol with a set of messages that may be sent to setup and teardown an association. The RSSP block 326 may be enabled to divide a session into four phases, for example, discovery, creation, message transfer and termination. A session may be further divided into one or more types based on the management console user role used to create the session, for example, operator sessions and administrator sessions. In accordance with an embodiment of the invention, a managed client may support at least two sessions simultaneously, one of each type.

During the discovery phase, the management console and the managed client may use the RMCP presence ping/pong messages to determine whether a particular managed client supports the RMCP security extensions. If the managed client supports the RMCP security extensions and the management console attempts to establish an association with that managed client, the management console may transition to the creation phase of the session protocol for that managed client. During the creation phase, the management console and the managed client may use the RSSP open session request/response messages to exchange session IDs, and negotiate the RSSP authentication and key generation protocol (RAKP) and the RSP integrity algorithm for the session. The management console may initiate the selected authentication and key generation protocol and generate the necessary keying material required for the RSP integrity algorithm. If the RSSP is successful, an association between the management console and the managed client may be formed and may transition to the message transfer phase of the session protocol. If the RSSP is not successful as a result of a lost message, both entities may re-initialize their protocol state. If the management console detects the lost message, it may restart the protocol at the beginning.

During the message transfer phase, the management console and the managed client may exchange the desired message necessary to manage the client. Each of these messages may be encapsulated within a RSP header and a RSP trailer with integrity protection provided by the RSP integrity algorithm negotiated during the creation phase. If the management console attempts to close a session, it may transition to the termination phase. During the termination phase, the management console and managed client may exchange the RSSP close session request/response messages and end the session. The plurality of messages that are transmitted to the RMCP security extensions UDP port prior to the establishment of a session at the end of the creation phase may be encapsulated within an RSP header that may use the bypass session ID.

The RAKP block 328 may utilize pre-shared symmetric keys and keyed-hashed message authentication code (HMAC) based integrity algorithms to mutually authenticate a management console to a given managed client and to generate pair-wise unique symmetric keying material that may be used with a plurality of integrity algorithms to provide protection for RMCP messages. The PET block 322 may be enabled to utilize SNMP trap protocol data units (PDUs) to send alerts. The SNMP block 324 may be utilized by network management applications to query a management agent using a supported management information base. The SNMP block 324 may be enabled to send SNMP trap PDUs.

The PET block 322 may be enabled to send alerts from a managed client to a management console. The SNMP block 324 may be utilized by network management applications to query a management agent using a supported management information base.

A management console may utilize RMCP to manage client systems. The management console may utilize OS-present methods as a primary method to power-down or reset a managed client so that any shutdown operation may be handled in an orderly fashion. The management consoles may employ RMCP if the managed client fails to respond to the OS-present methods.

The alert standard format (ASF) block 314 may include a set of security extensions that provide authentication and integrity services for RMCP messages. A RMCP-aware management console may determine a managed client's RMCP capabilities by issuing any of the following messages, for example. The management console may issue an RMCP presence ping message directed to the managed client. The RMCP-aware client may acknowledge receipt of the RMCP message as long as the RMCP version in the RMCP header 116 is a version supported by the client. The client may respond with a RMCP presence pong message and may set the supported entities field to indicate its ASF version. The management console may be enabled to issue a RMCP capabilities request message to the managed client. The client may acknowledge receipt of the RMCP message as long as the RMCP version in the RMCP header 116 is a version supported by the client. The client may respond with a RMCP capabilities response message by returning the system capabilities previously configured into the alert-sending device's non-volatile storage.

Web services may utilize SOAP block 312 or XML based messaging and HTTP block 320 or HTTPS 322 as a SOAP transport for communications. The use of SOAP over HTTP/HTTPS may require HTTP/TLS/TCP stack implementation. The HTTP/TLS/TCP stack implementation may be complex for embedded devices and large HTTP(S)/TLS/TCP code footprints may not be cost-effective for the devices with limited memory resources. Furthermore, the processing power required for transports protocol processing may lead to unacceptable response time or power consumption. Thus, the light-weight transport for SOAP may be utilized in OOB management environments.

The ASF specifications are defined for remote management of computer systems in OOB management environments. The RMCP block 332 and the RSP block 330 are part of a suite of protocols defined by the ASF specifications. In accordance with an embodiment of the invention, a web services interface may be provided for remote management of systems.

In accordance with an exemplary embodiment of the invention, the use of SOAP over RMCP/RSP may have a plurality of benefits. For example, the RMCP/RSP block 222 may be less complex than the combination of the HTTP block 220, the HTTPS block 216, the TLS block 218 and the TCP block 236. The RMCP/RSP block 222 may be a light-weight transport with messaging semantics, reliability support, authentication support, and support for multicast. The RMCP/RSP block 222 may be a better fit for the OOB management environment from the power, memory, and processing constraints perspective. The use of SOAP over RMCP/RSP may leverage the existing ASF/IPMI infrastructure and enable WS-MAN based management solutions for OOB management environments. The use of SOAP over RMCP/RSP may provide a better migration path from ASF to WS-MAN based management solutions.

The use of SOAP over RMCP/RSP may be referred to as a light-weight soap transport, for example. The light-weight SOAP transport may fit in a smaller code footprint and may be easier to implement. The light-weight SOAP transport may require lesser number of processing cycles as compared to the HTTP block 220 or the HTTPS block 216. The light-weight SOAP transport may provide security and reliability for OOB operations. The light-weight SOAP transport may be enabled to support one-way message-exchange-pattern (MEP), request-response MEP, and multicasting of SOAP messages.

The RMCP message may be media independent and, depending on the medium, the associated header fields may be different. The RMCP message may comprise a RMCP header 116 and a RMCP payload 118. The RMCP header 116 may comprise a version field, a reserved field, a sequence number field, and a class of message field. A new message class called Web services may be utilized for SOAP over RMCP mapping. The version field may identify the version of the RMCP header. The sequence number field may indicate the sequence number associated with the RMCP message. The sequence numbers may be utilized to ensure reliability over UDP and facilitate message ordering and recognition of identical messages. The sequence number may be incremented each time a unique message is sent from the same source, for example, from a management console or a client system. When the message initiator retries a message due to a missing RMCP acknowledge, the message initiator may send the exact message of the original transmission with the same sequence number allowing the message initiator to match an RMCP message to its associated acknowledgement.

The RMCP payload 118 may comprise an Internet assigned numbers authority (IANA) enterprise number field, a message type field, a message tag field, a reserve field, a data length field, and a data field. The IANA enterprise number field may indicate the IANA enterprise number associated with the entity that defines the message type values and data field format for the message. A new IANA enterprise number may be assigned for SOAP over RMCP. The message type field may be defined by the entity associated with the value in the previous field. For example, for SOAP over RMCP, the value of the message type field may be equal to 0 for a unicast one-way SOAP message. The value of the message type field may be equal to 1 for a multicast one-way SOAP message. The value of the message type field may be equal to 2 for a unicast SOAP request. The value of the message type field may be equal to 3 for a unicast SOAP response. The value of the message type field may be equal to 4 for a multicast SOAP request.

The message tag field may be utilized to match request-response pairs. The data length field may indicate the number of bytes presenting the data field. The data field may indicate the data associated with a particular enterprise number and message type. The data length field for SOAP over RMCP may be extended to 2 bytes, for example, using the reserved field so that a SOAP message may be up to 65535 bytes long, for example. The sequencing, message acknowledgements, and retransmission mechanisms as defined in ASF specification may be used without any modifications in order to provide better reliability over UDP.

The uniform resource identifier (URI) scheme for a light-weight transport may be defined according to the following syntax:

soap.rmcp://<host>[:<port>][/<rel_path>][?<query>]

The semantics for the URI scheme may comprise a plurality of default port numbers, for example, 0x026F for RMCP or 0x0298 for RMCP/RSP for OOB management services. If a port is specified, then the corresponding port number may be used. If no port number is specified, a default port number may be used. The host may be resolved to an IP address. The IP address and port may be used to send a message.

Figure 4:
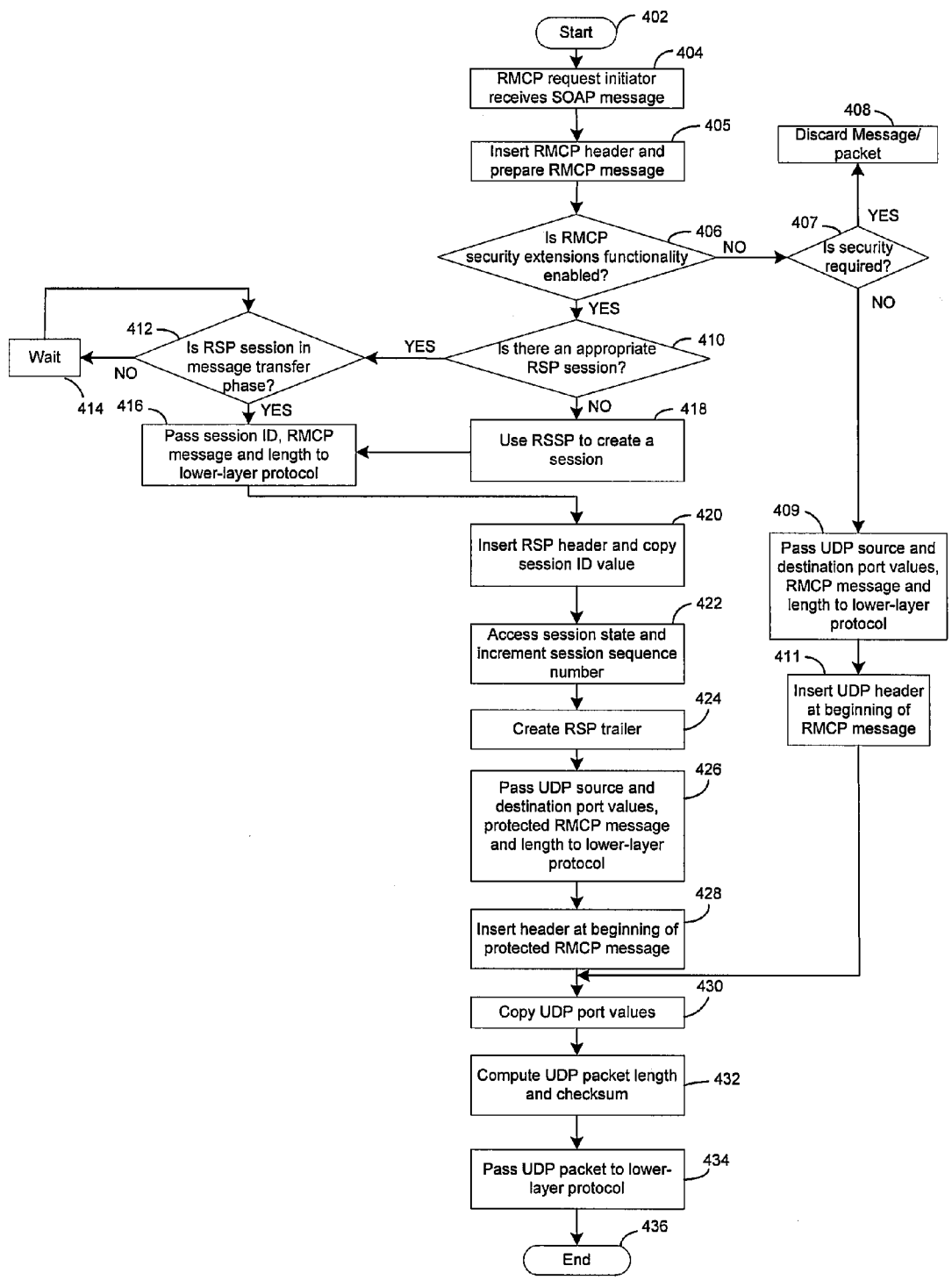
FIG. 4 is a flowchart illustrating exemplary steps for outbound message processing of a RMCP packet for web services based management, in accordance with various embodiment of the invention.

FIG. 4 is a flowchart illustrating exemplary steps for outbound message processing of a RMCP packet for web services based management, in accordance with various embodiment of the invention. Referring to FIG. 4, exemplary steps may begin at step 402. In step 404, the RMCP request initiator may receive a SOAP message. In step 405, the RMCP header may be inserted into the SOAP message. In step 406, the RMCP protocol engine may access the device security policy to determine whether RMCP security extensions functionality is enabled. If the RMCP security extensions functionality is not enabled, control passes to step 407. In step 407, it may be determined whether security is required. If security is not required, control passes to step 408. In step 408, the message may be discarded. If security is required, control passes to step 409. In step 409, the RSP block 330 may be enabled to update the message length to account for the addition of the RSP header and RSP trailer, and pass the UDP source and destination port values, the RMCP message length, and the RMCP message to the next lower-layer protocol, for example, UDP block 334 for additional processing. In step 411, the UDP block 334 may receive a message from the RSP block 330, and the sending device's UDP protocol engine may insert its header at the beginning of the RMCP message. Control then passes to step 430.

If the RMCP security extensions functionality is enabled, control passes to step 410. In step 410, it may be determined whether an appropriate RSP session exists for the SOAP message. If an appropriate RSP session does not exist for the SOAP message, control passes to step 418. In step 418, the RSSP block 326 may be enabled to create a session. Control then passes to step 416. If an appropriate RSP session exists for the SOAP message, control passes to step 412. In step 412, it may be determined whether the RSP session in the message transfer phase. If the RSP session is not in the message transfer phase, control passes to step 414. In step 414, the system may wait for a particular time period until the session reaches that phase before the RMCP message may be sent and return control to step 412. If the RSP session is in the message transfer phase, control passes to step 416. In step 416, the RMCP block 332 may pass the session ID, the RMCP message and the RMCP message length to the next lower-layer protocol for additional processing.

In step 420, the sending device's RSP protocol engine may receive the SOAP message from the RMCP block 332, and the RSP block 330 may insert a RSP header at the beginning of the message and may copy the session ID value into the RSP header's session ID field. In step 422, the RSP block 330 may use the session ID to access the session state, increment the session's sequence number and then insert the session sequence number value into the sequence number field of the RSP header. In step 424, the RSP block 330 may be enabled to create a RSP trailer at the end of the message's data block. The RSP block 330 may compute the amount of padding required to align the protected message's integrity data field on a data word boundary. The RSP block 330 may use the RMCP message length passed from the RMCP block 332 to locate the end of the message's data block, and insert the correct number of pad bytes and the values for the RSP trailer's pad length and next header fields. The RSP block 330 may use the session ID to access the session state and determine a particular integrity algorithm to be utilized with the message, and may compute the integrity data over the encapsulated message. The calculated value may be inserted into the integrity data field of the RSP trailer in order to create a protected RMCP message.

In step 426, the RSP block 330 may be enabled to update the message length to account for the addition of the RSP header and RSP trailer, and pass the UDP source and destination port values, the protected RMCP message length, and the protected RMCP message to the next lower-layer protocol, for example, UDP block 334 for additional processing. In step 428, the UDP block 334 may receive a message from the RSP block 330, and the sending device's UDP protocol engine may insert its header at the beginning of the protected RMCP message. In step 430, the UDP block 334 may be enabled to copy the port values passed from RSP block 330 into the UDP header's source port and destination port fields. In step 432, the UDP block 334 may be enabled to compute the UDP packet length and checksum and insert these values into the UDP length and checksum fields. In step 434, the resulting UDP packet may be passed to other lower-layer protocols, for example, IP block 338 and MAC/PHY layer block 340 for additional processing and eventual transmission to its destination. Control then passes to end step 436.

Figure 5:
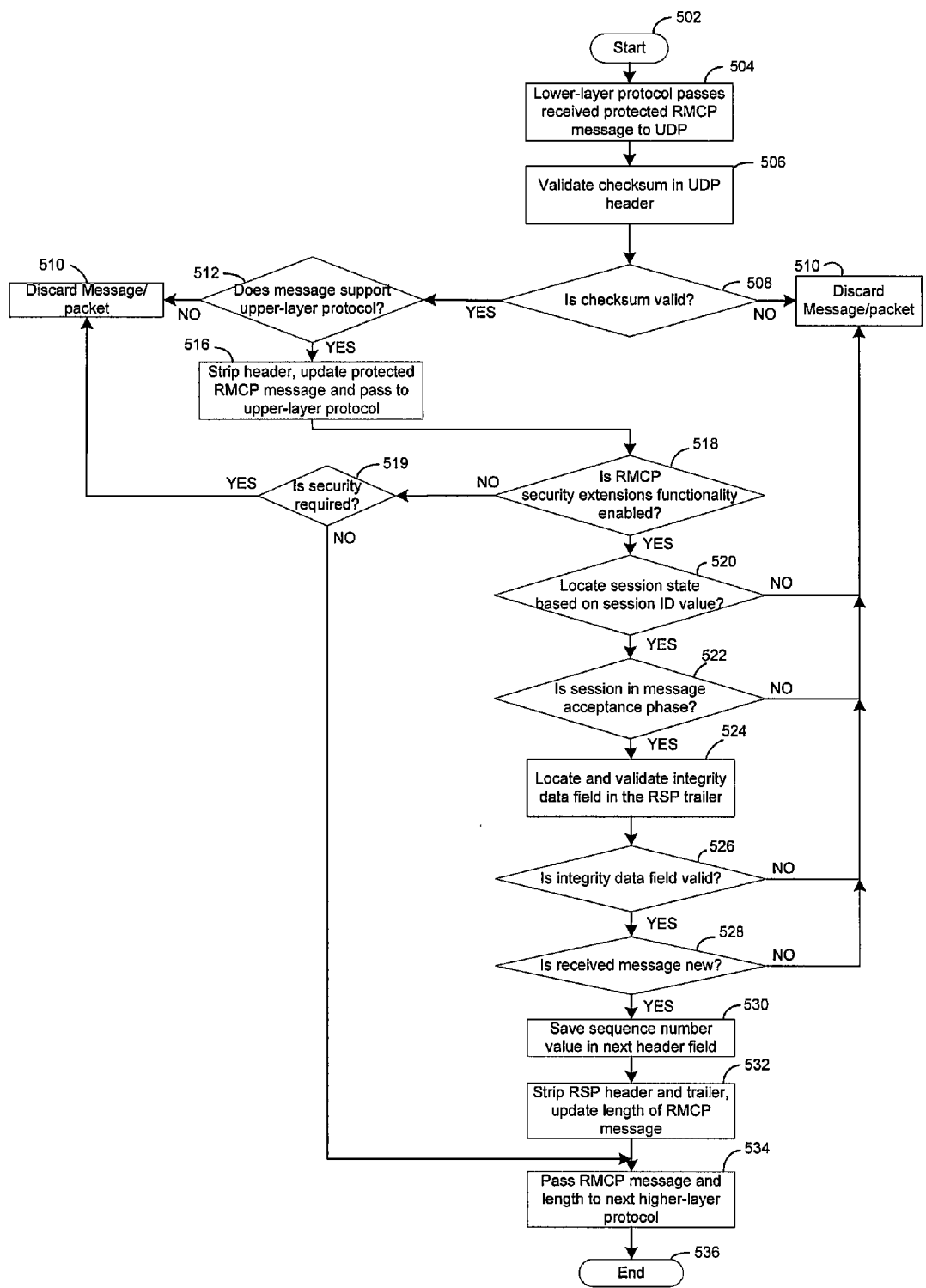
FIG. 5 is a flowchart illustrating exemplary steps for inbound message processing of a RMCP packet for web services based management, in accordance with various embodiment of the invention.

FIG. 5 is a flowchart illustrating exemplary steps for inbound message processing of a RMCP packet for web services based management, in accordance with various embodiment of the invention. Referring to FIG. 5, exemplary steps may begin at step 502. In step 504, the lower-layer protocols, for example, the MAC/PHY layer block 340 and IP block 338 in the receiving device may pass the received protected RMCP message to the next higher-layer protocol, for example, UDP block 334 for additional processing. In step 506, the UDP block 334 in the receiving device may be enabled to validate the checksum field in the UDP header. In step 508, it may be determined whether the checksum field is valid. If the checksum field is invalid, control passes to step 510. In step 510, the UDP block 334 may discard the packet. If the checksum field is valid, control passes to step 512. In step 512, it may be determined whether the received message supports an upper-layer protocol specified by the value in the destination port field. If the received message does not support an upper-layer protocol, control passes to step 510. In step 510, the UDP block 334 may discard the packet. If the upper-layer protocol is supported, control passes to step 516. In step 516, the UDP block 334 may strip off its header, update the protected RMCP message length and pass the protected RMCP message and its length to the next higher-layer protocol, for example, the RSP block 330 for additional processing.

In step 518, the RSP block 330 may receive the protected RMCP message from the UDP block 334, and the RSP block 330 may access the device security policy to determine whether RMCP security extensions functionality is enabled. If the RMCP security extensions functionality is disabled, control passes to step 519. In step 519, it may be determined whether security is required. If security is not required, control passes to step 510. In step 510, the RSP block 330 may discard the message. If security is not required, control passes to step 534.

If the RMCP security extensions functionality is enabled, control passes to step 520. In step 520, it may be determined whether the RSP block 330 may use the RSP header's session ID value to locate the session state for this message. If the session state may not be located for this message, control passes to step 510. In step 510, the RSP block 330 may discard the message. If the session state is located for this message, control passes to step 522.

In step 522, it may be determined whether the session is in a message acceptance phase. If the session is not in a message acceptance phase, control passes to step 510. In step 510, the RSP block 330 may discard the message. If the session is in a message acceptance phase, control passes to step 524. In step 524, the RSP block 330 may use the integrity algorithm specified in the session state and the protected RMCP message length passed from the UDP block 334 to locate and validate the integrity data field in the RSP trailer. In step 526, it may be determined whether the integrity data field is valid. If the integrity data field is invalid, control passes to step 510. In step 510, the RSP block 330 may discard the message. If the integrity data field is valid, control passes to step 528. In step 528, the RSP block 330 may use the RSP header's sequence number field and the sliding receive window information in the session state to determine whether the received message is new and not a duplicate of a previously received message and the position of the message with respect to the sliding receive window. If the received message is not a new message, control passes to step 510. In step 510, the RSP block 330 may discard the message.

If the received message is a new message, control passes to step 530. In step 530, the received message may be new and may be either inside the sliding receive window or to the right of the sliding receive window. If the received message is to the right of the sliding receive window, the sliding receive window may be advanced to the right to encompass the message. In accordance with an embodiment of the invention, a message may be received out-of-order and be properly processed. In step 530, if the sequence number processing completes successfully, the RSP block 330 may save the sequence number value in the next header field and use the value in the pad length field to compute the number of pad bytes that may be removed from the end of the message. In step 532, the RSP block 330 may strip off the RSP header and RSP trailer and update the length value of the RMCP message. In step 534, the RSP block 330 may pass the RMCP message and its corresponding length to the next higher-layer protocol, for example, the RMCP block 332 for additional processing. Control then passes to end step 536.

In accordance with an embodiment of the invention, a method and system for light-weight simple object access protocol (SOAP) transport for web services based management may include managing a system 150 using a simple object access protocol (SOAP) 312 message that is mapped over a light weigh transport protocol. The lightweight transport protocol may be one or both of: a remote management and control protocol (RMCP) 332 and a RMCP security extensions protocol (RSP) 330 to enable remote management of systems using Web services in out-of-band (OOB) management devices, for example, client 173, client 175, client 177 and client 179. The system, 150 may be managed using the mapped SOAP message and one or more Web services. The light-weight transport protocol may provide security and reliability for OOB operations. The light-weight transport protocol may be enabled to support one-way message-exchange-pattern (MEP), request-response MEP, and multicasting of SOAP messages. The light-weight transport protocol may be enabled to support retransmission and acknowledgement of receipt of the SOAP message. The system 150 may be secured by message authentication and/or checking the integrity of the mapped SOAP message. The light-weight transport protocol may also be enabled to support anti-replay protection of the SOAP messages.

Another embodiment of the invention may provide a machine-readable storage, having stored thereon, a computer program having at least one code section executable by a machine, thereby causing the machine to perform the steps as described above for light-weight simple object access protocol (SOAP) transport for web services based management.

The Applicant submits that no argument or statement herein should be construed as an admission or representation that practice of Applicant's claims necessarily results in operation that is not compliant with the ASF specification. On the contrary, Applicant submits that practice of the Applicant's claims may still result in operation that is indeed compliant with the ASF specification.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing network information, the method comprising:
managing, by at least one computing device, a system using a simple object access protocol (SOAP) message that is mapped over one or both of a remote management and control protocol (RMCP) and/or a RMCP security extensions protocol (RSP).

2. The method according to claim 1, comprising managing said system using said mapped SOAP message and one or more Web services.

3. The method according to claim 2, comprising remotely managing said system via said one or more Web services through out-of-band (OOB) management.

4. The method according to claim 3, comprising securing said system via said out-of-band (OOB) management.

5. The method according to claim 1, wherein said mapping supports one-way message exchange of said SOAP messages.

6. The method according to claim 1, wherein said mapping supports a request-response message exchange of said SOAP messages.

7. The method according to claim 1, wherein said mapping supports multicasting of said SOAP messages.

8. The method according to claim 1, comprising retransmitting said mapped SOAP message.

9. The method according to claim 1, comprising acknowledging receipt of said mapped SOAP message.

10. The method according to claim 1, comprising securing said system by authenticating said mapped SOAP message.

11. The method according to claim 1, comprising securing said system by checking an integrity of said mapped SOAP message.

12. The method according to claim 1, wherein said mapping supports anti-replay protection of said SOAP messages.

13. A system for processing network information, the system comprising:
one or more circuits that enable management of a system using a simple object access protocol (SOAP) message that is mapped over one or both of a remote management and control protocol (RMCP) and/or a RMCP security extensions protocol (RSP).

14. The system according to claim 13, wherein said one or more circuits enables management of said system using said mapped SOAP message and one or more Web services.

15. The system according to claim 14, wherein said one or more circuits enables remote management of said system via said one or more Web services through out-of-band (OOB) management.

16. The system according to claim 15, wherein said one or more circuits enables securing said system via said out-of-band (OOB) management.

17. The system according to claim 13, wherein said mapping supports one-way message exchange of said SOAP messages.

18. The system according to claim 13, wherein said mapping supports a request-response message exchange of said SOAP messages.

19. The system according to claim 13, wherein said mapping supports multicasting of said SOAP messages.

20. The system according to claim 13, wherein said one or more circuits enables retransmission of said mapped SOAP message.

21. The system according to claim 13, wherein said one or more circuits enables acknowledgment of receipt of said mapped SOAP message.

22. The system according to claim 13, wherein said one or more circuits enables securing said system by authenticating said mapped SOAP message.

23. The system according to claim 13, wherein said one or more circuits enables securing said system by checking an integrity of said mapped SOAP message.

24. The system according to claim 13, wherein said mapping supports anti-replay protection of said SOAP messages.

25. A machine-readable storage having stored thereon, a computer program having at least one code section for processing network information, the at least one code section being executable by a machine for causing the machine to perform steps comprising:
managing a system using a simple object access protocol (SOAP) message that is mapped over one or both of a remote management and control protocol (RMCP) and/or a RMCP security extensions protocol (RSP).

26. The machine-readable storage according to claim 25, wherein said at least one code section comprises code for managing said system using said mapped SOAP message and one or more Web services.

27. The machine-readable storage according to claim 26, wherein said at least one code section comprises code for remotely managing said system via said one or more Web services through out-of-band (OOB) management.

28. The machine-readable storage according to claim 27, wherein said at least one code section comprises code for securing said system via said out-of-band (OOB) management.

29. The machine-readable storage according to claim 25, wherein said mapping supports one-way message exchange of said SOAP messages.

30. The machine-readable storage according to claim 25, wherein said mapping supports a request-response message exchange of said SOAP messages.

31. The machine-readable storage according to claim 25, wherein said mapping supports multicasting of said SOAP messages.

32. The machine-readable storage according to claim 25, wherein said at least one code section comprises code for retransmitting said mapped SOAP message.

33. The machine-readable storage according to claim 25, wherein said at least one code section comprises code for acknowledging receipt of said mapped SOAP message.

34. The machine-readable storage according to claim 25, wherein said at least one code section comprises code for securing said system by authenticating said mapped SOAP message.

35. The machine-readable storage according to claim 25, wherein said at least one code section comprises code for securing said system by checking an integrity of said mapped SOAP message.

36. The machine-readable storage according to claim 25, wherein said mapping supports anti-replay protection of said SOAP messages.

* * * * *